United States Patent [19]

Levine

[11] Patent Number: 4,549,215

[45] Date of Patent: Oct. 22, 1985

[54] LOW NOISE BLACK LEVEL REFERENCE FOR CCD IMAGERS

[75] Inventor: Peter A. Levine, Trenton, N.J.

[73] Assignee: RCA Corporation, Princeton, N.J.

[21] Appl. No.: 482,855

[22] Filed: Apr. 7, 1983

[51] Int. Cl.[4] .............................................. H04N 3/14
[52] U.S. Cl. .................... 358/213; 358/167
[58] Field of Search ......................... 358/213, 167, 36

[56] References Cited

U.S. PATENT DOCUMENTS

| | | | |
|---|---|---|---|
| 4,435,730 | 3/1984 | Bendell | 358/213 |
| 4,463,383 | 7/1984 | Soneda | 358/213 |
| 4,466,018 | 8/1984 | Soneda | 358/213 |
| 4,496,982 | 1/1985 | Levine | 358/213 |
| 4,499,497 | 2/1985 | Levine | 358/213 |

FOREIGN PATENT DOCUMENTS

54-56717  5/1979  Japan .................................. 358/213

Primary Examiner—Gene Z. Rubinson
Assistant Examiner—L. C. Schroeder
Attorney, Agent, or Firm—Eugene M. Whitacre; William H. Meise; Lawrence C. Edelman

[57] ABSTRACT

Low frequency streaking noise which is effected by modulating the black reference with high frequency noise is eliminated from the displayed picture in a television system by switching the signal during the horizontal blanking interval to a noise-free black reference. A CCD or other imagers where a pixel-by-pixel reference is available provide a unique opportunity to eliminate low frequency streaking in the video display. Each pixel of a solid state imager includes a black level reference. In accordance with the invention, a switch circuit is added to a correlated double sampling system used in conjunction with a CCD imager. During the horizontal blanking interval the switch is rendered conductive to substitute a noise-free reference derived from the pixel clamp.

29 Claims, 7 Drawing Figures

LOW NOISE BLACK LEVEL REFERENCE FOR CCD IMAGERS

The present invention relates to apparatus for processing the output signals from camera systems such as used for imaging and, more particularly, to processing circuitry for reducing low frequency noise which may appear in a displayed image of a charged-coupled device (CCD).

BACKGROUND OF THE INVENTION

CCD imagers of the field transfer type comprise an image (A) register, a storage (B) register and a read-out (C) register. The A-register includes a matrix of photosensitive elements that receive radiant photon energy, i.e., light, from a scene being viewed. The charge proportional to the intensity of the radiant energy is generated, and the accumulated charge is stored for some period of time, less than one field in the case of a television signal. During the vertical blanking interval the accumulated charge is transferred in columns from the A-register to the B-register under the control of clocking signals. During the horizontal blanking interval, one horizontal line of charges is shifted in parallel to the C-register under the control of a clock signal. During the active portion of a horizontal television line the charge packets are serially read out of the C-register under the control of a clocking signal. During the next horizontal blanking interval the next horizontal line is parallel shifted into the C-register from the B-register. Eventually all of the lines stored in the B-register are shifted into and then read out of the C-register. After one field has been read out of the B-register it is ready to receive another field of accumulated charge from the A-register. The invention described herein is not limited to field transfer type of imagers. It would apply to other devices as well, for example, an interline transfer type of imagers.

The output signal from the C-register can be sensed by a floating diffusion of an on-chip charge-to-voltage converter. The output signal which is derived from the floating diffusion is buffered by a MOSFET amplifier which is integrated onto the same chip as that in which the imager is formed to achieve low input capacitance. Such transistors compatible with the CCD fabrication processes, however, have a large 1/f noise, i.e., the noise energy per unit of bandwidth increases as frequency decreases. In particular, this noise is especially troublesome from DC to about 100 KHz and causes random horizontal streaks and flicker in the displayed image. These streaks and flicker are visible under low illumination conditions.

Further, CCD imagers having floating diffusion output stages have an associated reset noise. After a packet of accumulated charge has been sensed, the floating diffusion is reset in preparation to receive the charge during the next clock pulse. The reset noise arises from the reset of the floating diffusion to the reset drain through a conductive channel modulated by thermal noise.

The use of prior art correlated double sampling (CDS) in conjunction with CCD imagers having floating diffusion output stages greatly reduces floating diffusion reset noise and removes low frequency amplifier noise. CDS circuits for use with visible CCD imagers have been built and produce a significant improvement in low light level performance. The resulting high frequency noise, however, which modulates the black reference can be converted to low frequency noise in some systems. In accordance with the present invention a further reduction in the low frequency noise of a CCD imager system is realized.

SUMMARY OF THE INVENTION

In accordance with one aspect of the invention a clamping arrangement for a television imager is provided. The clamping arrangement includes a pixel-rate clamping means coupled to the imager for receiving therefrom television signals comprising first pixel intervals during which the signal is representative of light levels alternating with reset signal intervals not representative of light levels for clamping the signal to a reference potential during the reset signal intervals. A line-rate clamping means for clamping signals applied to an input terminal of the line-rate clamping means is further provided. The line-rate clamping means operates during a portion of each horizontal line of the television signals without the active portion of the horizontal line, i.e., during the horizontal blanking interval, for clamping signals to a reference potential during the horizontal blanking interval. Direct-current-blocking means are provided which couple the line-rate clamping means to the pixel-rate clamping means. The direct-current-blocking means is provided for AC-coupling the signal. When the noise occurring during the portion of each horizontal line exclusive of the active portion of the video departs from average black level, it causes the line-rate clamping means to charge the DC blocking means to an atypical black level and thus add a low frequency noise component to the twice clamped signal. The stretched-out low frequency noise appears as horizontal streaking in the video display. The improvement includes first switch means coupled to the input side of the direct-current-blocking means for coupling the input side of the direct-current-blocking means to a point of reference potential during an interval including the portion of the horizontal blanking interval whereby the line-rate clamping means operates during a time of reduced noise to attenuate the low frequency noise component and the horizontal streaking.

DETAILED DESCRIPTION OF THE PREFERRED EMBODIMENTS

Figure 1:
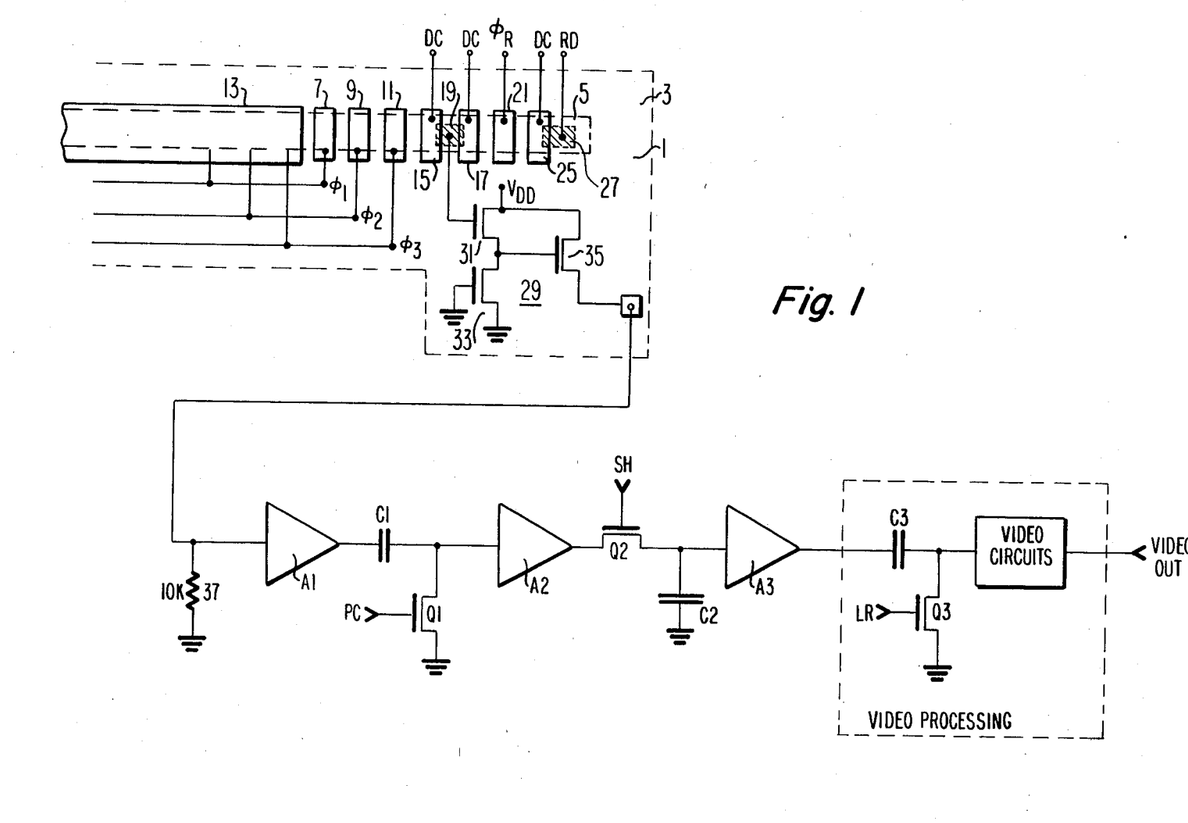
FIG. 1 shows, partially in block diagram form, an output stage of the C-register of a CCD imager and a correlated double sampling circuit coupled thereto.

FIG. 1 is a schematic diagram, partially in block diagram form, of the output stage of a CCD C-register and associated CDS circuitry. The C-register 1 may be formed in accordance with well known methods to form a triple-level-polysilicon CCD device. A P-type silicon substrate 3 in a buried-channel CCD imager is doped to have a channel of N-type material 5 defining the buried channel within which charge packets are transferred. A plurality of electrodes 7, 9, 11 receive phase clock signals $\phi_1$, $\phi_2$, $\phi_3$, respectively. The plurality of electrodes extends to the left for substantially the entire length of substrate 3. The details of each electrode are not shown; however, a block 13 is provided to represent the individual electrodes. It should be noted that the individual electrodes (e.g., 7, 9 and 11) are shown as being non-overlapping whereas in a triple-level-poly device adjacent electrodes are overlapping. Under the control of the clock signals, the charge packets (not shown) are shifted to the right. For example, when $\phi_1$ goes low or negative, a packet of charge which resides thereunder is almost instantaneously shifted so that it resides under electrode 9. On the next cycle $\phi_2$ goes low and the packet is almost instantaneously shifted to reside under gate 11 and so on. More detail of the clocking and movement of charge packets is provided in the description of FIG. 2. When gate 11 goes low the packet is shifted past DC biased gate 15 to a floating diffusion 19 in the output section of the CCD. Floating diffusion 19 serves as a source electrode of an FET comprising reset gate 21, DC gates 23 and 25 and reset drain 27. Drain 27 is connected to a positive source of potential (not shown) to reset the FET after each charge-to-voltage conversion. Gate 21 receives a reset signal $\phi_R$. Gate 15 receives a DC bias to shield diffusion 19 from the clock signals present on electrodes 7, 9 and 11. Similarly, gates 23 and 25 prevent the reset clock signal from being coupled to floating diffusion 19 and reset drain 27, respectively. Further, gates 15, 17 and 25 substantially prevent random noise in the clock and reset signals from coupling to diffusion 19 and drain 27 as the case may be.

The diffusion 19 capacitance must be small to obtain a usable output voltage at low light levels. Therefore, the output section 29 comprises a MOSFET buffer amplifier. The MOSFET buffer amplifier includes on-chip MOSFETs, 31, 33 and 35. The floating diffusion 19 is applied to the gate of MOSFET 31 which is connected as a source follower with current-source-connected MOSFET 33 for low distortion and high input impedance. The first source follower output is coupled to the gate of MOSFET 35 which is also connected in a source follower configuration with passive load 37 off chip. The drains of MOSFETs 31 and 35 are connected to a source of positive voltage $V_{DD}$, while the source and gate of MOSFET 33 are coupled to ground. The output from the MOSFET buffer amplifier is connected via resistor 37 to the input of preamplifier A1. In general, resistor 37 should be small for large bandwidth since it forms a voltage divider with the internal resistance of the MOSFET buffer amplifier, which divider reduces the output voltage. On the other hand, resistor 37 should not be too small. A problem with the MOSFET buffer amplifier is that it has a large amount of 1/f noise although the low capacitance of diffusion 19 provides a high S/N at high frequencies. Another problem with the output stage of the CCD is reset noise. The reset noise arises from the reset of the floating diffusion 19 to reset drain 27 through the conductive channel 5 modulated by thermal noise.

The output signal from the on-chip MOSFET buffer amplifier 29 is applied to the input of preamplifier A1 which has a gain of about 10. Capacitor C1 and transistor Q1 form a clamp circuit which is used to DC restore each pixel to ground potential during the time when reset noise is present on the floating diffusion but before the signal charge has been received. This, in general, removes the reset noise from the pixel relative to the subsequently transferred signal charge. The clamped signal is applied to amplifier A2 which in general comprises a high impedance input and emitter follower for impedance matching. After the signal charge is transferred to floating diffusion 19, transistor Q2 is turned-on to sample the signal which is then stored on capacitor C2, i.e., Q2 and C2 form a sample and hold circuit. The cycle of clamping and sample and holding is carried out for each pixel. After CDS processing the signal is applied to amplifier A3 which too may comprise an emitter follower for an impedance matching to capacitor C3 and transistor Q3. C3 and Q3 form a clamp circuit which is used for line-by-line black level clamping during the horizontal blanking interval. Capacitor C3 and transistor Q3 are a part of subsequent video processing circuitry used for dynamic range conditioning, black level restore, etc. In a video system where the video output is AC coupled there may be a plurality of black level clamping circuits used for clamping the black level on a line-by-line basis. The later stages of a video processing amplifier are not shown.

Figure 2:
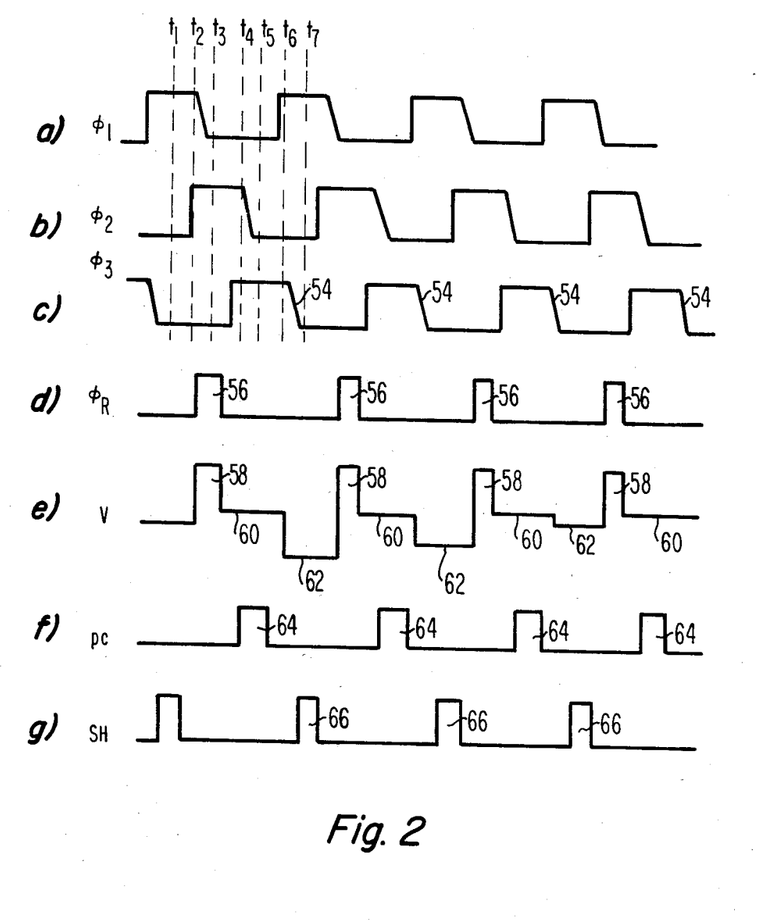
FIG. 2 is a general timing diagram descriptive of the charge transfer in the imager and circuit of FIG. 1.

A more detailed explanation of the charge transfer in a CCD and CDS processing is provided with reference to FIG. 2. FIG. 2 shows waveform diagrams of various signals associated with a three-phase CCD television camera. Waveforms a, b and c illustrate the slightly greater than ⅓ duty cycle signals $\phi_1$, $\phi_2$ and $\phi_3$ coupled to every third electrode of the CCD C-register, e.g., electrodes 7, 9 and 11, respectively. Waveform d illustrates the reset signal $\phi_R$ used to reset the floating diffusion after the signal charge has been readout. The video signal at the output of the chip, i.e., the voltage at the source of the on-chip buffer amplifier MOSFET 29, is depicted by waveform e. Further, the pixel clamping and sample and hold signals are illustrated by waveforms f and g, respectively.

Assuming a charge packet (not shown) is stored under electrode 7 of FIG. 1 representative of a particular signal level, it is transferred as follows. At a time $t_1$ (FIG. 2) signal $\phi_1$ is high and the charge packet is stored under electrode 7. It should be noted that this cycle may be generalized to describe charge transfer along the C register, for example, at $t_1$ the signal charge packets present in the C-register are stored under the $\phi_1$ gates. At time $t_2$ signals $\phi_1$ and $\phi_2$ are high and signal $\phi_3$ is low thus the charge packet resides under electrodes 7 and 9. At $t_3$ signal $\phi_2$ is high and signals $\phi_1$ and $\phi_3$ are low thus the remaining charge that was stored under electrode 7 is transferred to reside under electrode 9 only. During the next cycle, represented by times $t_4$ and $t_5$, the charge packet is transferred to reside under electrode 11. At $t_6$ the charge packet is shared under electrode 11 and floating diffusion 19. When signal $\phi_1$ goes high half of the charge packet is shifted past electrode 15 to floating diffusion 19. At $t_7$ when signal $\phi_1$ is high and signals $\phi_2$ and $\phi_3$ are low the rest of the charge packet is shifted past electrode 15 and the entire charge packet is stored on the floating diffusion. Prior to the transfer of charge from electrode 11 the floating diffusion 19 is reset by reset pulse 56 as shown by waveform d. The video signal shown by waveform e at the floating diffusion 19 is reset by the reset pulse 56. During the reset intervals when pulses 56 of signal $\phi_R$ are present the video output is at the reset potential. After the reset pulse has been removed, the floating diffusion is capacitively driven to a value of pedestal 60. This reset switch restores the potential of floating diffusion 19 before a new charge packet is transferred thereto. As the $\phi_3$ clock goes negative 54 the signal charge packet stored under gate 11 is pushed over the DC barrier potential under gate 15 to floating diffusion 19. The corresponding transfer to floating diffusion 19 causes a discharge of the floating diffusion to a voltage relative to pedestal 60. The reset of the MOSFET which restores the potential of the floating diffusion introduces a certain amount of reset noise on the pedestal 60 of waveform e. This reset noise may be effectively removed by using the correlated double sampling. After the reset pulse is received the clamp switch Q1 is turned on by the pulse 64 shown in waveform f. The effect of this clamp pulse is to restore each pixel to ground potential during the time when reset noise is present on the floating diffusion but before the signal charge is received. After the signal charge is transferred to floating diffusion 19, transistor Q2 is turned on as shown by sample and hold pulses 66 of waveform g to sample the signal which is then stored on capacitor C2.

Since television systems employ AC coupling, CCD imager black reference is obtained by overscanning the horizontal output register, C-register, into the horizontal blanking interval. Clamping to this black reference adds a low frequency streaking noise to the displayed image at low light levels for solid state imagers (it should be noted that this low frequency streaking noise also appears in pickup-type tubes) because high frequency noise modulating the black reference is held during the line interval by the clamping circuit C3, Q3 which amounts to a conversion of high-frequency noise to low-frequency streaking. This effect can be reduced by increasing the clamp time constant. A time constant of about 10 lines is typically used which converts the high frequency noise to streaking bands of about 10 lines in width. Further increase in the clamping time constant causes colorimetry errors in color cameras.

The CCD and other forms of solid state imagers provide a unique opportunity to solve the low frequency clamp noise problem because with these imagers a black level reference is available for each pixel, i.e., during the pixel clamping interval. The clamping to the reference potential is already being done in a CDS circuit and may be taken advantage of downstream for the line-by-line black level clamping. Pixel by pixel clamping downstream may be impractical because of the bandwidth limitations of typical video amplifiers. This band limiting effect causes loss of detail within the pixel making it impossible to locate the black reference shelf 60 referred to in FIG. 2e. Furthermore, it should be noted that the technique described herein is also applicable to systems using a pixel clamp alone without the subsequent correlated second pixel sampling. The pixel clamp provides the black level reference which is available for each pixel.

Figure 3:
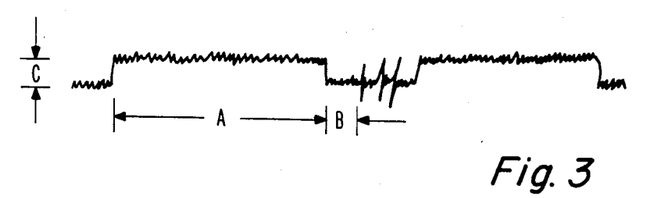
FIGS. 3 and 6 show portions of television signals used in an explanation of the invention.

Referring to FIG. 3 a video signal shows a an active television line as interval A. In interval A a dark field is depicted. The dark current is about 2 percent of the normal signal at room temperatures. The video signal in the interval A is read out, after which the video drops to true black during the overscan period shown by the interval B. The black reference during the overscan period contains high frequency noise which is stretched by the line clamp to give the streaking noise in the displayed image as discussed above. The amplitude difference shown by C represents the dark current collected from the image and storage registers. In accordance with the present invention a new black reference is generated at the output of the correlated double sampling circuit. This new black reference is much lower in noise and can be used in subsequent line-by-line DC restore circuits to produce a displayed image free of visible low frequency noise.

Figure 4:
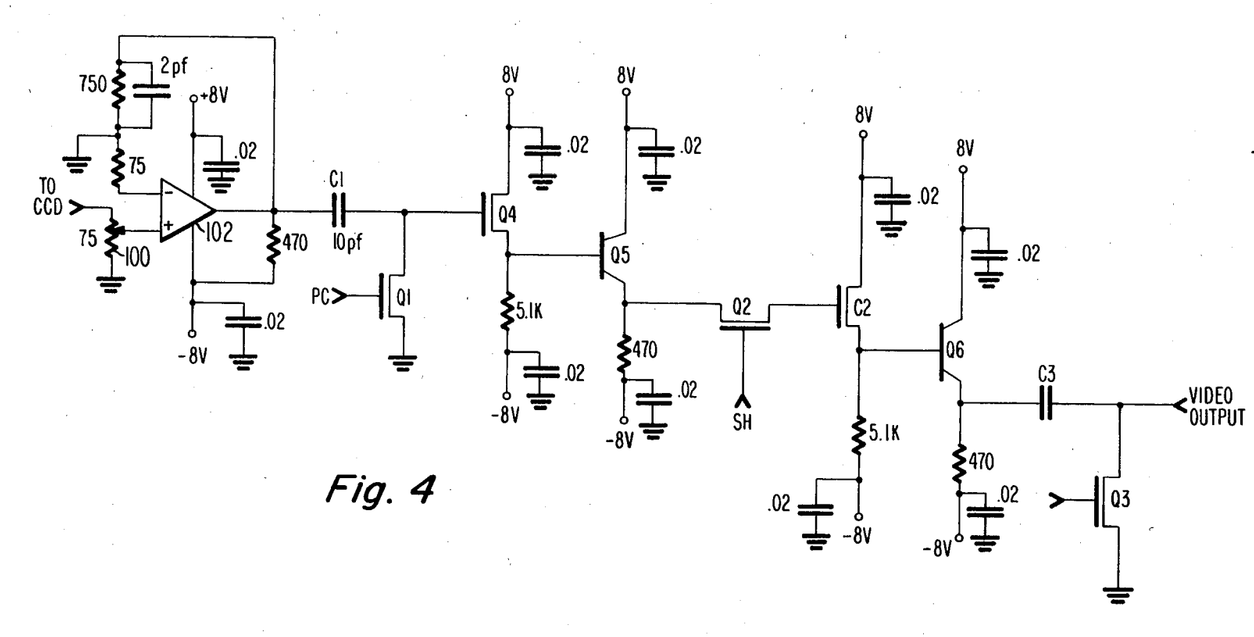
FIG. 4 is a detailed schematic of a portion of the arrangement of FIG. 1.

Referring to FIG. 4 a detailed schematic of a correlated double sampling circuit and line rate clamp is provided. In the FIGURES, elements designated with like reference numerals are the same or similar items in the various FIGURES. The output from the CCD is applied via potentiometer 100 to the noninverting input of op-amp 102. In the video system described herein it should be noted that the video signal is processed upside down and then inverted at the output. Illustratively op-amp 102 may be a wideband operational amplifier such as an NE5539 available from Signetics Corporation. In the arrangement shown in FIG. 4 op-amp 12 provides a voltage gain of about ten times. The output from op-amp 102 is applied to the clamp circuit including capacitor C1 and transistor Q1. Illustratively transistor Q1 may be of an SD211-type FET transistor. The clamped signal is applied to the input side of source follower Q4 which is coupled to emitter follower Q5. Illustratively the transistor for source follower Q4 may be of an 3N154-type FET transistor and emitter follower Q5 may be of a 2N4124-type bipolar npn transistor. The output of the emitter follower Q5 is applied to the sample and hold circuit which comprises transistor Q2 and transistor C2. The capacitance at the gate node of C2 acts as a storage capacitor of the sample and hold circuit. Illustratively, transistor Q2 may be an SD211-type FET transistor and transistor C2 may be a 3N154-type FET transistor. The output of the sample and hold circuit is applied to emitter follower Q6. Illustratively, transistor Q6 may be a 2N4124-type bipolar npn transistor. The output of emitter follower Q6 is applied to the line-rate clamp comprising capacitor C3 and transistor Q3.

Figure 5:
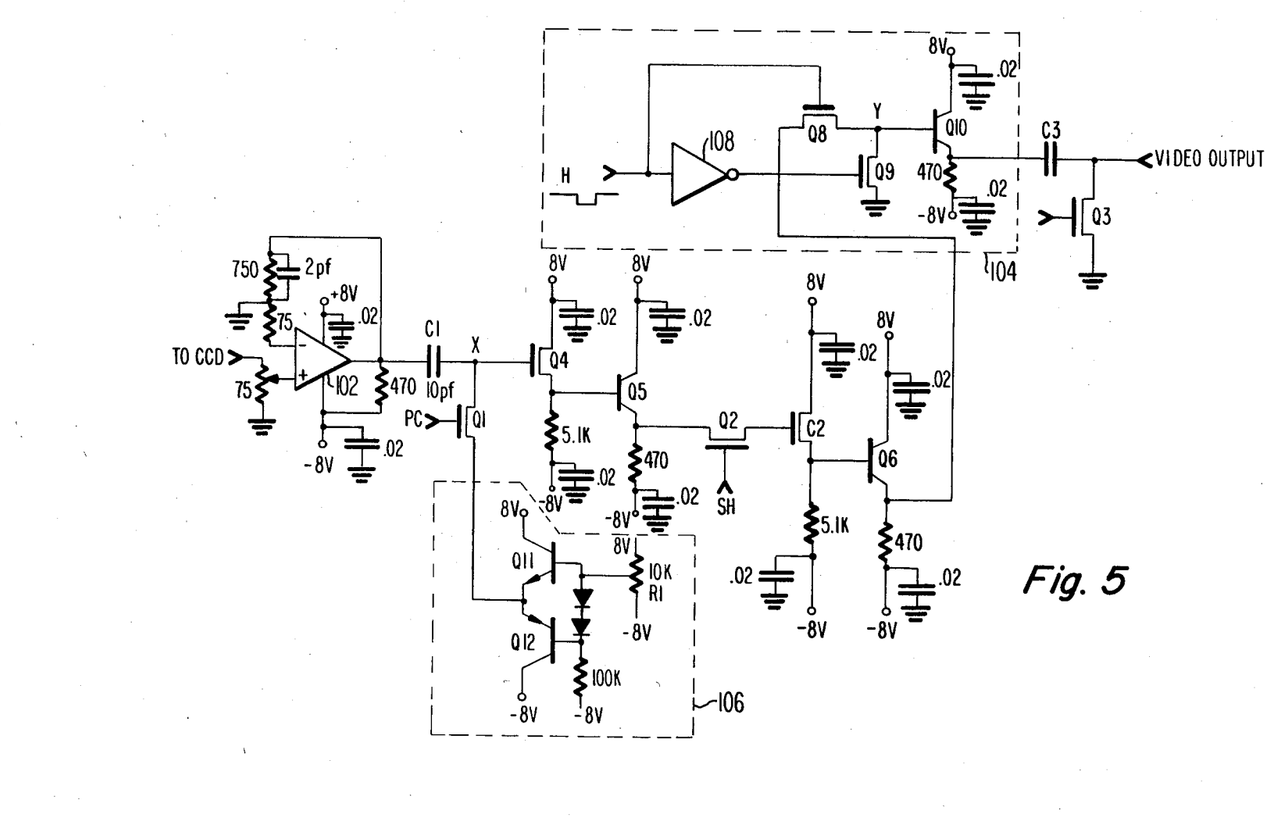
FIG. 5 is a schematic of signal processing circuitry used to recover signals from a CCD imager in accordance with the principles of the present invention.

The operation of the circuit of FIG. 4 has been described earlier with reference to FIG. 1 and, therefore, a detailed explanation of its operation will not be provided again. Referring to FIG. 5, details of the circuit additions provided in accordance with the present invention are shown. Only those portions of the circuit of FIG. 5 which are changed from FIG. 4 will be explained in detail. Those portions of the circuit which are not described may be assumed to be the same as those of FIG. 4. The added portions of FIG. 5 have been enclosed by dash lines. The two parts added include the switch arrangement identified by reference numeral 104 and the variable clamp level circuit indicated by reference numeral 106.

At the output of emitter follower Q6, two analog switches Q8 and Q9 have been added. The switches are controlled by the horizontal blanking pulse indicated by H, Q8 being switched in accordance with the horizontal blanking pulse while Q9 is switched by the inverted horizontal blanking pulse which is transmitted through inverter 108. During the horizontal blanking interval transistor Q8 is biased off and transistor Q9 is biased on, thereby pulling the base of the output transistor Q10, which is an emitter follower, to ground. During the active horizontal line the compliment is true, i.e., Q8 is on and Q9 is off. Thus, Q8 is on during the active horizontal line to pass the video signal from the emitter of emitter follower Q6 to the line rate clamp C3, Q3 through emitter follower Q10. Illustratively, transistors Q8 and Q9 may be SD211-type FET transistors and transistor Q10 may be a 2N4124-type bipolar npn transistor.

In addition to the switch 104, clamp level circuit 106 has been added. The voltage at the source of the pixel clamp transistor Q1 can be adjusted using the low impedance complimentary transistor pair Q11 and Q12 of circuit 106. Thus the offset voltage between point X at the drain of Q1 and point Y at the drain of Q9 may be adjusted to provide an effective reference potential at both points. In operation, diodes D1 and D2 are set to turn transistors Q11 and Q12 slightly on when the input signal is 0, i.e., when the potentiometer R1 output is approximately 0. With this bias one transistor begins turning on as signal swing brings the other transistor close to its turnoff point. Quiescent current through the device is controlled by the current biasing the diodes, by the relative voltage drops of the diodes and the output transistor emitter-base junctions. At any non-zero signal level only one of the two transistors is supplying current and this transistor is essentially the emitter follower loaded by a transistor which is turned off. If the npn transistor Q11 is turned on then the pnp transistor Q12 is turned off and vice versa. Thus the active line pedestal may be set by the pixel clamp.

The adjustable voltage source at the pixel clamp may be provided by other circuits well known in the art, such as a voltage-follower connected op-amp having its output couled to the drain electrode of Q1 and its non-inverting input connected to the wiper of potentiometer R1.

Figure 6:
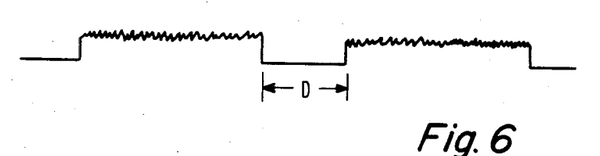

In accordance with the additions shown in FIG. 5 the video output during the blanking time is a true black reference and is virtually noise free. Therefore, after this point, AC coupling can be used in conjunction with line-by-line DC restore without adding low frequency noise to the displayed image. It should be noted that node X at the drain of Q1 and node Y at the base of Q10 are DC coupled. The video out obtained from this circuit is shown by FIG. 6. As shown by FIG. 6 during the horizontal blanking interval marked D the signal is virtually noise free which may be compared with the FIG. 3 arrangement wherein the blanking interval contains noise. This method of video processing yields a picture generally free of low frequency noise and of stretched black level interval noise. It should be noted that this arrangement would apply to any imager wherein a pixel-by-pixel black level reference is available.

Figure 7:
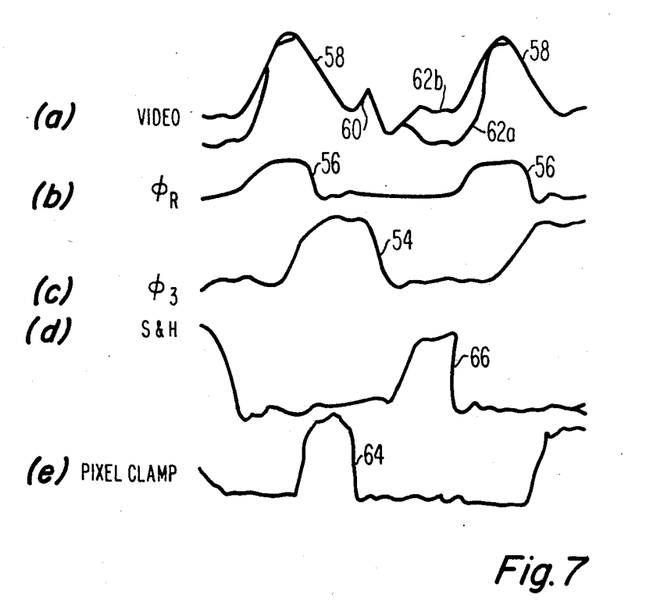
FIG. 7 is a detail of a timing diagram made from photographs of signals from a CCD imager displayed on an oscilloscope.

The waveform diagrams shown in FIG. 4 are idealized and it should be realized that the actual waveforms of the signal in a CCD imager are less well defined. Referring to FIG. 7 a representation of actual traces of signals form a CCD imager with a read out clock rate of 8 MHz taken by a camera mounted on a oscilloscope are shown. The top trace a represents the video signal at the output of the on-chip floating diffusion buffer amplifier. The peaks 58 represent the video at the time that the reset pulses 56 are received as shown in waveform b. The pedestal is represented by reference numeral 60. The video represents two levels, a white signal level shown by trace 62a and a black signal level shown by trace 62b. Waveform c represents a pulse 54 of the $\phi_3$ clock. Waveform d shows the sample and hold pulse 66 and waveform e shows the pixel clamp pulse 64.

Of course, it will be realized by one of skill in the art that one, two or three imagers may be required to produce a signal representative of a color image. According to one technique the red, green and blue components of the incident light are separated by optical prisms or other light splitting means and imaged onto three separate imagers; one for red, one for green and one for blue.

It will be appreciated that many other embodiments are possible within the spirit and scope of the invention. For example, the pedestal adjust 106 shown in FIG. 5 may be implemented by other techniques such as a simple voltage divider. Further, it should be pointed out that the switches Q8 and Q9 of FIG. 5 may be replaced with other devices. For example, switch Q8 may be replaced by a resistor of appropriate value or alternatively switch Q9 may be replaced by a resistor. Furthermore, the source of Q1 may be grounded and pedestal control 106 applied to the source of Q9. Also the principles of the present invention can be applied to other devices other than three-phase CCD imagers, for example, two- or four-phase imagers and other solid state imagers.

What is claimed is:

1. A clamping arrangement for a television imager, comprising:
   pixel-rate clamping means coupled to the imager for receiving therefrom a television signal comprising first pixel intervals during which the television signal is representative of light levels alternating with reset signal intervals not representative of light levels, for clamping the television signal to a reference potential during said reset signal intervals;
   line-rate clamping means for clamping signals applied to an input terminal of said line-rate clamping means, said clamping means operating during a portion of each horizontal line of said television signals without the active portion of said horizontal line for clamping said television signal to a reference potential during said portion of each horizontal line;
   direct-current-blocking means coupling said line-rate clamping means to said pixel-rate clamping means for ac-coupling said signal whereby noise occuring during said portion of each horizontal line without the active portion causes said line-rate clamping means to add to the television signal a low-frequency noise component which appears as horizontal streaking;
   wherein the improvement comprises:
   first switch means coupled to the input side of said direct-current-blocking means for coupling said input side of said direct-current-blocking means to a point of reference potential during an interval including said portion of each horizontal line whereby said line-rate clamping means operates during a time of reduced noise, said low-frequency noise component is attenuated and said streaking is reduced.

2. The arrangement according to claim 1 wherein said direct-current-blocking means comprises a series capacitor and said line-rate clamping means comprises a second switch means coupled to the output side of said capacitor and to ground for coupling said output side of said capacitor to ground during said portion of each horizontal line.

3. The arrangement according to claim 2 wherein said second switch means is rendered conductive during said portion of each horizontal line and said portion of each horizontal line comprises an overscan of the horizontal line.

4. The arrangement according to claim 3 wherein said first switch means comprises a first transistor which is rendered conductive during said interval to couple said signals from said imager to ground thereby attenuating the noise component of said signals.

5. The arrangement according to claim 4 wherein said first switch means further comprises a second transistor which is rendered conductive during said active portion of said horizontal line to dc couple the television signal from said pixel-rate clamping means to said input side of said direct-current-blocking means, said first transistor being rendered conductive when said second transistor is non-conductive and being rendered non-conductive when said second transistor is conductive.

6. The arrangement according to claim 5 wherein said reference potential to which said pixel-rate clamping means is clamped is adjustable.

7. The arrangement according to claim 6 wherein said adjustable reference potential is adjusted to provide a point of reference potential which is coupled via said switch means to said input side of said direct current blocking means.

8. In a camera system for generating video signals, an apparatus comprising:
    an imager having an output stage;
    first clamping means, coupled to said output stage of said imager, for clamping said video signals, comprising pixels representative of light levels, during first intervals, said first clamping means clamping said video signals to a first signal level for effectively clamping to a reference potential to remove reset noise arising in said output stage of said imager;
    second clamping means for clamping said video signals to a second signal level for effectively clamping to said reference potential during at least a portion of a horizontal line of said video signals, said portion of said horizontal line being without the active video portion of said horizontal line;
    direct current blocking means, for receiving and for ac coupling signals from the output of said first clamping means; and
    switch means alternately coupling said video signals appearing at the output of said first clamping means during first intervals of said active video portion of said horizontal line and a third signal level which is said effective reference potential during second intervals without said active video portion of said horizontal line to the input side of said direct current blocking means.

9. The apparatus according to claim 8 wherein said direct current blocking means comprises a series capacitor and said second clamping means comprises a second switch coupled to the output side of said capacitor and to said effective reference potential for coupling said output side of said capacitor to said third signal level during said second intervals without said active video portion.

10. The apparatus according to claim 9 wherein said second switch is rendered conductive during said second intervals without said active video portion and said second intervals comprise an overscan of the horizontal line.

11. The appraatus according to claim 10 wherein said switch means comprises a first transistor which is rendered conductive during said second intervals to couple said video signal to said effective reference potential.

12. The apparatus according to claim 11 wherein said switch means further comprises a second transistor which is rendered conductive during said first intervals to dc couple said video signal from said first clamp means to said input side of said direct current blocking means, said first transistor being rendered conductive when said second transistor is non-conductive and being rendered non-conductive when said second transistor is conductive.

13. The apparatus according to claim 12 wherein said first signal level is adjustable.

14. The apparatus according to claim 13 wherein said adjustable first signal level is adjusted to provide a point of reference potential which is coupled via said switch means to said input side of said direct current blocking means.

15. In a camera system for generating video signals, a method for processing said video signals derived from an imager comprising the steps of:
    generating a video signal comprising pixels representative of light levels of an image alternating with first signal intervals representative of a first reference signal level;
    clamping said video signal to a first node which is at a first reference potential during said first signal intervals to provide said reference signal level thereby eliminating reset noise effected during signal recovery processes;
    switching said clamped video signal during a portion of each horizontal line of said video signal, said portion being without the active video portion of said horizontal line, to a second reference potential for providing a noise-free reference level during said portion of said each horizontal line of said video signal; and
    clamping said switched clamped video signal to a second node which is at a third reference potential during said portion of each horizontal line to provide a noise free black reference for said video signal during said portion of each horizontal line.

16. A clamping arrangement for a television imager, comprising:
    pixel-rate clamping means coupled to the imager for providing pixel-rate clamping to a television signal generated by said imager, said signal including first pixel intervals during which the signal is representative of light levels alternating with reset signal intervals during which the signal is not representative of light levels, said pixel-rate clamping means establishing for said television signal a reference potential level during said reset signal intervals;
    line-rate clamping means for clamping signals applied to an input terminal of said line-rate clamping means, said clamping means operating during a portion of each horizontal line of said television signal without the active portion of said horizontal line for clamping said signal to a reference potential during said portion of each horizontal line; and
    AC coupling means for AC coupling said pixel-rate clamped television signal to said input terminal of said line-rate clamping means whereby noise occurring during said portion of each horizontal line without the active portion causes said line-rate clamping means to add to the television signal a low-frequency noise component which appears as horizontal streaking;

wherein the improvement comprises:

first switch means coupled to the input side of said coupling means for coupling said input side of said coupling means to a point of reference potential during an interval including said portion of each horizontal line, whereby said line-rate clamping means operates during a time of reduced noise, thereby attenuating said low-frequency noise component and reducing said streaking.

17. The arrangement according to claim 16 wherein said coupling means comprises a series capacitor and said line-rate clamping means comprises a second switch coupled to the output side of said capacitor and to ground for coupling said output side of said capacitor to ground during said portion of each horizontal line.

18. The arrangement according to claim 17 wherein said second switch is rendered conductive during said portion of each horizontal line and said portion of each horizontal line comprises an overscan of the horizontal line.

19. The arrangement according to claim 18 wherein said first switch means comprises a first transistor which is rendered conductive during said interval to couple said signals from said imager to ground thereby attenuating the noise component of said signals.

20. The arrangement according to claim 19 wherein said first switch means further comprises a second transistor which is rendered conductive during said active portion of said horizontal line to dc couple the television signal from said pixel-rate clamping means to said input side of said coupling means, said first transistor being rendered conductive when said second transistor is non-conductive and being rendered non-conductive when said second transistor is conductive.

21. The arrangement according to claim 20 wherein said reference potential to which said pixel-rate clamping means is clamped is adjustable.

22. The arrangement according to claim 21 wherein said adjustable reference potential is adjusted to provide a point of reference potential which is coupled via said switch means to said input side of said coupling means.

23. In a camera system for generating video signals, an apparatus comprising:

an imager having an output stage;

first clamping means, coupled to said output stage of said imager, for clamping said video signals, comprising pixels representative of light levels, during first intervals, said first clamping means clamping said video signals to a first signal level for effectively clamping to a reference potential to remove reset noise arising in said output stage of said imager;

second clamping means for clamping said video signals to a second signal level for effectively clamping to said reference potential during at least a portion of a horizontal line of said video signals, said portion of said horizontal line being without the active video portion of said horizontal line;

coupling means for receiving and for ac coupling signals from the output of said first clamping means; and switch means alternately coupling said video signals appearing at the output of said first clamping means during first intervals of said active video portion of said horizontal line and a third signal level which is said effective reference potential during second intervals without said active video portion of said horizontal line to the input side of said coupling means.

24. The apparatus according to claim 23 wherein said coupling means comprises a series capacitor and said second clamping means comprises a second switch coupled to the output side of said capacitor and to said effective reference potential for coupling said output side of said capacitor to said third signal level during said second intervals without said active video portion.

25. The apparatus according to claim 23 wherein said second switch is rendered conductive during said second intervals without said active video portion and said second intervals comprise an overscan of the horizontal line.

26. The apparatus according to claim 25 wherein said switch means comprises a first transistor which is rendered conductive during said second intervals to couple said video signal to said effective reference potential.

27. The apparatus according to claim 26 wherein said switch means further comprises a second transistor which is rendered conductive during said first intervals to dc couple said video signal from said first clamp means to said input side of said coupling means, said first transistor being rendered conductive when said second transistor is non-conductive and being rendered non-conductive when said second transistor is conductive.

28. The apparatus according to claim 27 wherein said first signal level is adjustable.

29. The apparatus according to claim 28 wherein said adjustable first signal level is adjusted to provide a point of reference potential which is coupled via said switch means to said input side of said coupling means.

* * * * *